Jan. 12, 1965  R. L. KONKLE  3,165,032
FLUID PISTON
Filed Nov. 29, 1963
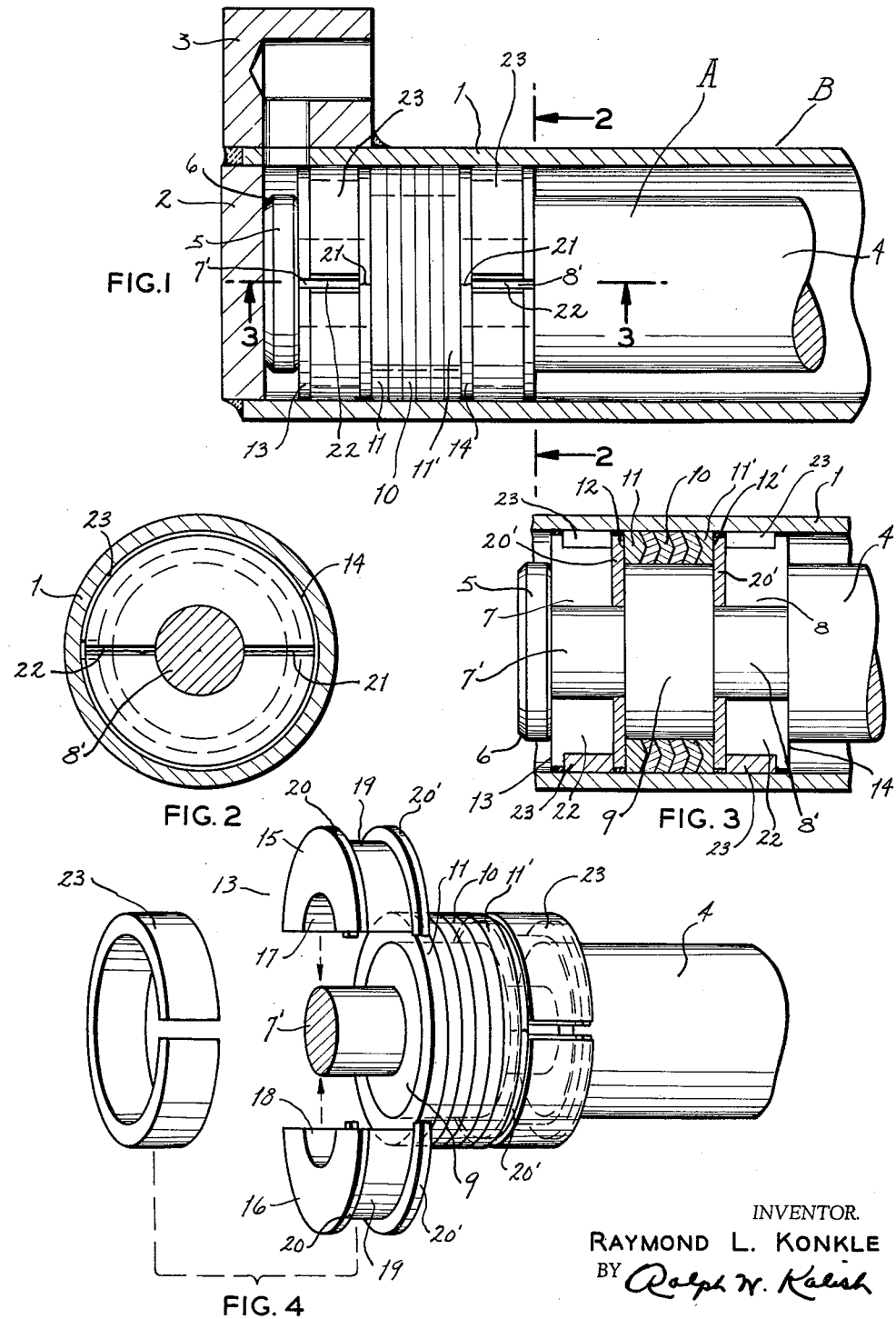
INVENTOR.
RAYMOND L. KONKLE
BY Ralph W. Kalish
ATTORNEY

United States Patent Office 3,165,032
Patented Jan. 12, 1965

3,165,032
FLUID PISTON
Raymond L. Konkle, Clinton, Iowa, assignor to Central Steel Tube Company, Clinton, Iowa, a corporation of Iowa
Filed Nov. 29, 1963, Ser. No. 327,001
7 Claims. (Cl. 92—252)

This invention relates in general to fluid cylinders, and, more particularly, to a piston therefor adapted for facile replacement of packing rings.

It is an object of the present invention to provide a piston for fluid cylinders carrying an unique arrangement of interfitting packing rings for providing a positive seal enhancing the efficiency of operation of the cylinder and which effectively withstands pressures of relatively greater loads than have been resisted in comparable cylinders.

It is another object of the present invention to provide a piston having a series of unitary unbroken packing rings carried encirclingly on the outer face of said piston and being thus adapted for ready removal as by being withdrawn in a sliding manner from the piston.

It is a still further object of the present invention to provide a piston carrying a series of unbroken packing rings with novel retaining means for maintaining the packing rings in operative position and for facilitating withdrawal of the same for replacement purposes.

It is an additional object of the present invention to provide a piston of the character stated incorporating easily removed wear strips; which piston may be easily disassembled and reassembled without developed skill on the part of the operator; and which is most economical in production and in usage.

Other objects and details of the invention will be apparent from the following description, when read in connection with the accompanying drawing wherein:

FIGURE 1 is a fragmentary side elevational view of a fluid piston constructed in accordance with and embodying the present invention, showing the same in operative position within a cylinder which latter is shown in section.

FIGURE 2 is a vertical transverse section taken on the line 2—2 of FIGURE 1.

FIGURE 3 is a horizontal transverse section taken on the line 3—3 of FIGURE 1.

FIGURE 4 is an exploded view of the piston with the head removed.

Referring now by reference characters to the drawing which illustrates the preferred embodiment of the present invention, A generally designates a piston for operative disposition within a fluid cylinder B, which latter is of generally conventional character comprising an annular side wall 1 with a smooth finish to its inner face for providing a sliding surface for facilitating reciprocating movement therein of piston A. For illustrative purposes only, one end wall 2 and a fluid connection 3 of cylinder B are shown.

Piston A comprises a shaft 4 having an external diameter substantially less than the internal diameter of cylinder wall 1 and being constructed of a durable material capable of withstanding the highly developed forces created within the cylinder, such as from hydraulic or pneumatic pressures. At one of its ends, piston A incorporates a head or end plate 5 having a beveled edge 6 adjacent its end face. In its portion adjacent head 5, shaft 4 is turned down to provide a pair of longitudinally spaced annular grooves indicated 7, 8 of like longitudinal and radial extent, there being a shaft section or divider 9 intermediate said grooves 7, 8. Said shaft section 9 is of like diameter as shaft 4 and head 5.

Carried encirclingly about the periphery of shaft section 9 is a plurality of piston packing rings 10, each being unbroken and having an inside diameter substantially equivalent to the outside diameter of said shaft section 9. On their lateral faces, each piston packing ring is complementarily contoured for snug interfitting engagement with the adjacent packing ring 10, being thus of general V-shape in cross-section to unitarily provide an effective, reliable seal. Said rings 10 are constructed of any suitable material, such as rubber, or a synthetic having the desired density and elastic property. Also, surrounding shaft section 9 at opposite ends of the series of piston packing rings 10 are packing rings 11, 11', being formed of phenolic or other resinous material and being contoured on their side contiguous with the rings 10 for suitable surface interengagement therewith and on their other faces, as at 12, 12', respectively, being flat with the planes thereof normal to the axis of shaft 4. The combined longitudinal extent of piston packing ring 10 and packing rings 11, 11' is slightly greater than the length of shaft section 9. The flat outer end faces 12, 12' of said rings 11, 11' will be planarwise parallel with the adjacent face of shaft section 9 (FIGURE 3).

Tightly received within each groove 7, 8, being disposed about the reduced shaft portions 7', 8' therein, are retainer members 13, 14, respectively, each of which is of two-part construction, being comprised of a pair of semicircular elements 15, 16 having inner complementary arcuate recesses 17, 18, respectively, for embracing the related reduced shaft portions 7', 8'. Formed on the peripheral face of each retainer member 13, 14 is a circumferentially extending, relatively shallow recess 19 delimited by side shoulders or recesses 20, 20'. Said retainer members 13, 14 have a radial extent slightly less than the combined radii of shaft section 9 and piston packing rings 10, so that during operation there will be no untoward contact between the peripheral edges of rims 20, 20' and the inner face of wall 1 of cylinder B. (FIGURES 1 and 3.)

Semicircular elements 15, 16 of each retainer member 13, 14 are so constructed that when the same are in mounted disposition, the rim portions 20' of each will abut to form a tight interfitting joint, as indicated 21, (FIGURE 1), but with the opposite confronting face portions of said semicircular elements 15, 16 being cut back so as to effect the development of a groove-like opening therebetween, as at 22 (FIGURE 1). Thus, when in operative position, the face of each retainer member adjacent the related shoulder 20' will be presented against the proximate packing rings 11, 11' so as to provide a substantially unbroken surface preventive of fluid leakage.

Provided for disposition within the recess 19 developed by the cooperative elements 15, 16 of each retainer member 13, 14 is a wear strip 23 of split-ring character and being preferably of a phenolic resin, or like material having desired rigidity with limited inherent resilience for ease of withdrawal from, and insertion within, recess 19. It should be noted that the retainer members 13, 14 are of such axial extent as to fit snugly between piston head 5 and shaft section 9, and shaft section 9 and shaft 4, respectively, so that the same maintain the interfitted series of packing rings 11, 11' and piston packing rings 10 against undesired axial displacement and hence in proper operative disposition. The said retainer members 13, 14 serve to compress packing rings 11, 11' and piston packing rings 10 tightly together, causing the side surfaces of said rings 10, 11, 11' to tend to flatten, thereby forcing said rings both radially inwardly and outwardly to form a snug seal with shaft section 9 and the inner face of cylinder wall 1. It will be observed that the outer peripheral face of wear strip 23 projects beyond rims 20, 20' for engaging the inner face of cylinder wall 1 and to prevent any untoward contact of said rims with the cylinder B.

The mounting and dismounting of the packing ring assembly should be apparent from the foregoing. However, in the event it is desired to replace any of the packing rings 10, 11, 11', the shaft 4 may be withdrawn from cylinder B in a customary manner, as through the end, not shown, and thereupon the wear strip 23 may be easily removed by spreading of the ends adjacent the spit or slot therein. Upon such removal of wear strip 23, the elements 15, 16 of each retainer member 13, 14 may then be withdrawn from the respective shaft portions 7', 8' by parting action. In actual practice, there is little likelihood that retainer member 14 would necessarily be withdrawn since it does not provide any obstacle to removal of the packing rings 10, 11, 11' which may be removed longitudinally toward head 5 and be simply slipped thereover. Replacement rings may be disposed in operative position by reversal of the foregoing through movement across head 5 for proper disposition upon shaft section 9 and after the replacement rings 10, 11, 11' have been suitably disposed in interengaged relationship, the user will then mount retainer elements 15, 16 upon shaft portion 7' and then return wear strip 23 to recess 19.

It will, thus, be seen that no special tools are required for the replacement operation, nor is there involved any intricate engagement of elements with piston A, since the associated parts are so inter-related and designed as to reliably interfit in a positive manner and with full assurance of requisite presentation of the packing rings for fluid-proof sealing action.

The present invention, hence, materially reduces the amount of time theretofore deemed requisite for changing piston packings and provides a structure having marked simplicity of parts, which conduces to both economy in production as well as economy in operation.

It should be understood that changes and modifications in the formation, construction, arrangement, and combination of the several parts of the fluid piston may be made and substituted for these herein shown and described without departing from the nature and principle of my invention.

Having thus described my invention, what I claim and desire to secure by Letters Patent is:

1. For use in a fluid cylinder, the improvement comprising a piston shaft disposed for axial movement within said cylinder, a series of adjoining piston packing rings encircling the outer face of said piston shaft, and a pair of removably mounted retainer members carried on said shaft at opposite ends of the series of piston rings to prevent axial displacement thereof, each of said retainer members being of two-part complementary construction.

2. For use in a fluid cylinder, the improvement comprising a piston shaft disposed for axial movement within said cylinder, a plurality of piston packing rings encircling the outer face of said piston shaft, each of said piston packing rings having complementarily contoured sides for snug interfitting engagement with the adjacent piston packing rings, and a pair of longitudinally spaced retainer rings carried on said shaft at opposite ends of the series of piston packing rings, preventing axial displacement of the piston packing rings and retaining same in operative position, each of said retainer rings being of two-part complementary construction for fitted disposition upon the piston shaft.

3. For use in a fluid cylinder, the improvement as defined in claim 2 and further characterized by said piston shaft having a pair of axially spaced apart annular grooves, with said retainer rings being disposed within said grooves, and projecting in their peripheral portions beyond the outer face of the piston shaft.

4. For use in a fluid cylinder, the improvement comprising a piston shaft disposed for axial movement within said cylinder, there being a plurality of annular grooves provided in said piston shaft in axially spaced relationship, a plurality of continuous piston packing rings disposed encirclingly about the outer face of said shaft between adjacent grooves, retainer elements mounted on said shaft and within said grooves each of said retainer elements being of two-part construction having complementary semicircular components, said retainer elements projecting beyond the outer face of said shaft and abutting on one side against the adjacent piston packing ring for compressing same between said retainer elements for maintaining same in operative position.

5. For use in a fluid cylinder, the improvement as defined in claim 4 and further characterized by said retainer elements being provided in their outer face with a circumferentially extending recess, and a wear strip removably carried in said recess.

6. For use in a fluid cylinder, the improvement as defined in claim 4 and further characterized by each retainer element being provided in its outer peripheral face with a shallow circumferentially extending recess and circular rim portions at opposite sides of said recess, a wear strip removably carried in said recess and the outer end edges of said rims being radially inwardly of the outer edges of said piston packing rings.

7. For use in a fluid cylinder, the improvement comprising a piston shaft disposed for axial reciprocal movement within said cylinder, a head provided at one end of said shaft and being of like diameter as said shaft, said shaft having a pair of longitudinally spaced apart annular grooves in the head-adjacent portion of said shaft, there being a shaft section intermediate said grooves and being of like diameter as the shaft, a series of unbroken piston packing rings encirclingly disposed about the outer face of said shaft section, each of said piston packing rings having complementarily contoured side faces for snug interfitting engagement with the adjacent piston packing rings, the series of piston packing rings having a combined longitudinal extent slightly greater than that of the shaft section, annular retainer elements carried in each groove, each retainer element being comprised of two interfitted semicircular parts adapted when in mounted position to present a continuous side face against the adjacent piston packing ring, whereby the piston packing rings are compressed between said retainer elements for stabilization in operative position, each retainer element being provided with a circumferentially extending recess and a wear strip removably carried in said recess, the outer face of said wear strip projecting beyond the adjacent outer edges of the respective retainer element and being substantially aligned with the outer faces of the piston packing rings.

References Cited by the Examiner

UNITED STATES PATENTS

| | | | |
|---|---|---|---|
| 2,216,353 | 10/40 | Park | 92—252 |
| 2,284,340 | 5/42 | Nuckles | 92—244 |

RICHARD B. WILKINSON, *Primary Examiner.*

KARL J. ALBRECHT, *Examiner.*